United States Patent

[11] 3,554,506

[72] Inventor Charles L. Seefluth
Bartlesville, Okla.
[21] Appl. No. 783,657
[22] Filed Dec. 13, 1968
[45] Patented Jan. 12, 1971
[73] Assignee Phillips Petroleum Company
a corporation of Delaware

[54] RAPID HEATING OF THICK WALL PARISON PREFORMS
10 Claims, 3 Drawing Figs.

[52] U.S. Cl. .................................................. 263/7, 34/31
[51] Int. Cl. ..................................................... F27b 9/16
[50] Field of Search ........................................... 263/7, 52, 2; 18/(Digest); 34/31

[56] References Cited
UNITED STATES PATENTS
| | | | |
|---|---|---|---|
| 1,474,705 | 11/1923 | Bluemel | 263/7 |
| 1,786,142 | 12/1930 | Wyman | 263/7 |
| 2,515,841 | 7/1950 | Stuart | 263/7 |

Primary Examiner—John J. Camby
Attorney—Young and Quigg

ABSTRACT: A parison preform is placed in a heating block so as to heat the parison from the outside by means of conductive heat, during which time a fluid such as air is circulated through the parison to impart heat from the inside.

PATENTED JAN 12 1971
3,554,506
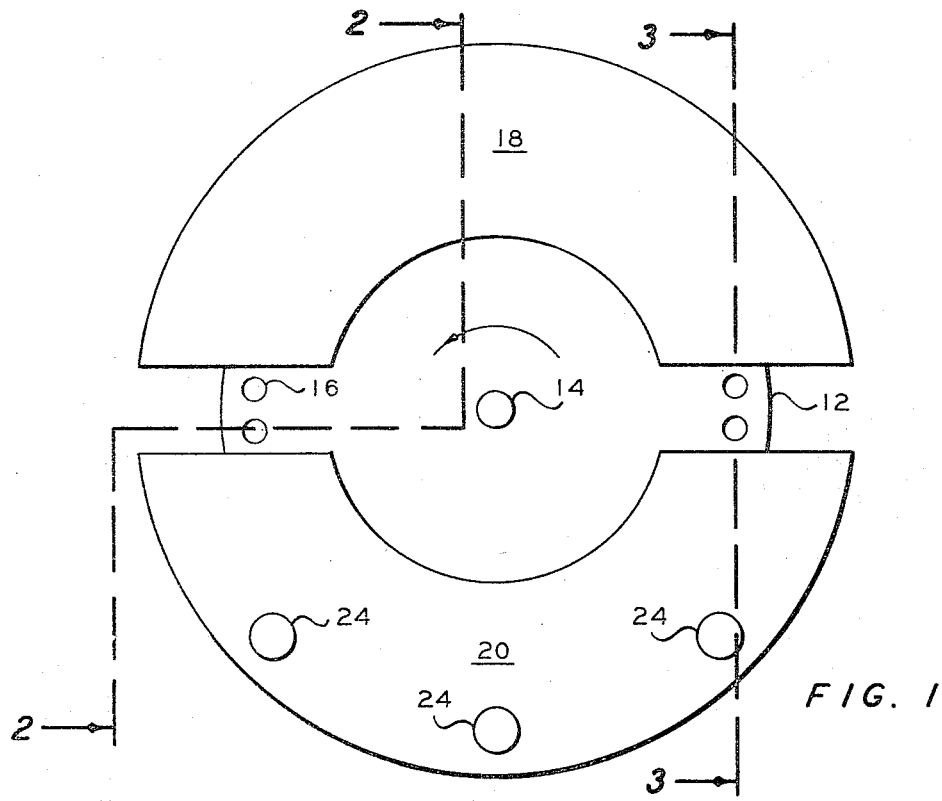
FIG. 1
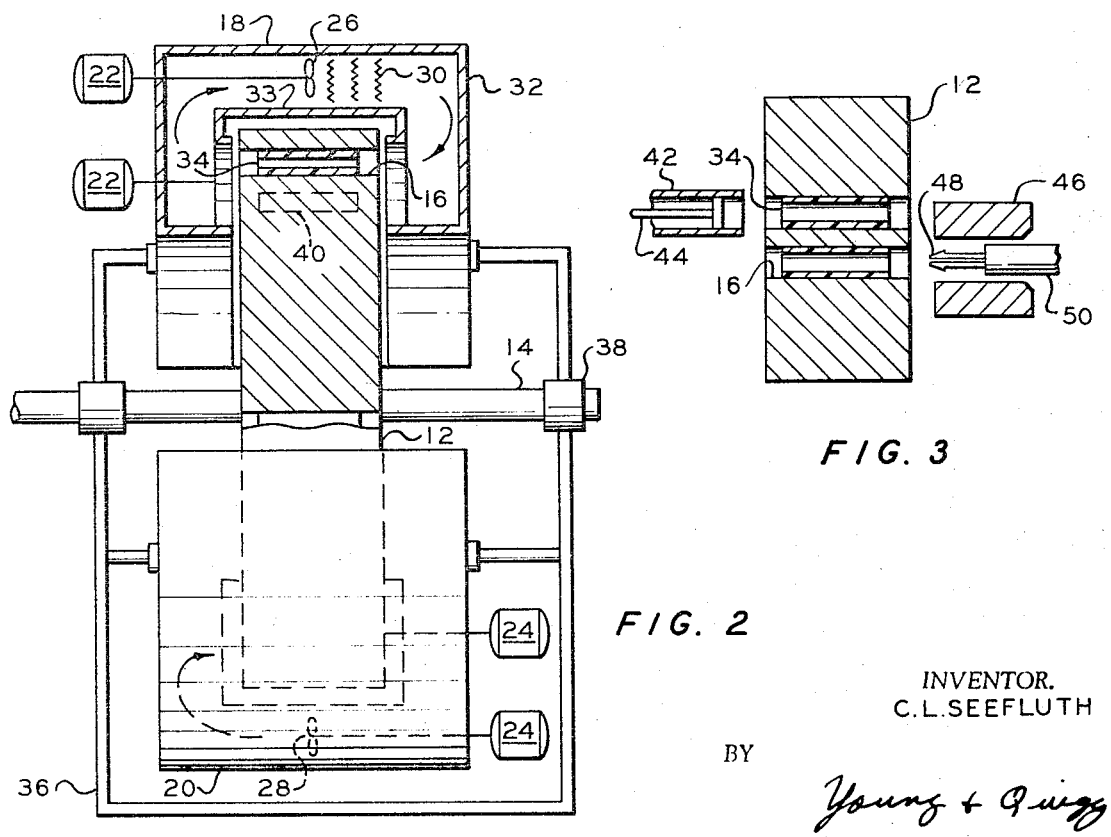
FIG. 2
FIG. 3
INVENTOR.
C.L. SEEFLUTH
BY
Young + Quigg
ATTORNEYS

RAPID HEATING OF THICK WALL PARISON PREFORMS

BACKGROUND OF THE INVENTION

This invention relates to a process and apparatus for heating a preformed hollow parison.

While the blow molding art goes back over 100 years, it has only been in the last dozen years that the blow molding of hollow plastic articles has achieved significant commercial success. With this expanded utilization of blow molding techniques has come progressively more rigorous requirements from the purchasers of the finished product with regard to the appearance, durability, chemical resistance, low cost, and the like of the product.

It is a well-known fact that many polymers which are particularly suitable for blow molding such as the olefin polymers, undergo the phenomenon known as orientation when stretched in the solid state at a temperature below the crystalline melt point. Since the orientation occurs at a temperature just below the crystalline melt point while the polymer is on a heating cycle, it was early recognized that little orientation could be effected in a conventional blow molding operation wherein a molten parison was extruded between mold halves and blown; first the temperature of the parison could not be controlled close enough, and second the slight orientation achieved was predominantly in the circumferential direction since at best only a minor amount of stretching in the longitudinal direction occurred. One method of achieving the desired product is to extrude or mold a hollow parison preform, cool it to room temperature, carefully reheat is to just below its crystalline melt point, and then transfer it to a molding station where it is grasped at both ends, stretched longitudinally, thus imparting orientation in a longitudinal direction, and thereafter placed quickly in a mold and expanded to conform to the shape of the mold by the introduction of fluid pressure into the interior of the parison, thus stretching it circumferentially to impart orientation in a second direction. Such a procedure achieves a product of exceptional strength, and surprisingly, in the case of materials such as polypropylene, greatly improved optical properties.

However, since it is necessary to heat substantially the entire parison to a temperature within a rather narrow range just below the crystalline melting point in order to take full advantage of the orientation phenomenon, certain problems are inherent in such a process. Particularly with thicker wall parisons there is a problem of achieving even rapid heating of the parison preform.

With thicker walled parisons, the heating times in an air oven become undesirably high, generally being 20 minutes or more. The parisons can be placed in a heating block, having holes corresponding to the outside diameter of the parison so as to achieve more rapid heating through direct conductive type heating, but this, too, presents certain problems. For one thing, as a practical matter, the heating block cannot be appreciably longer than the length of the parison and thus there is inherent in such a heating method an "end effect" whereby the ends of the parison are heated less. Also, while the heating time is reduced by utilizing a heating block over that required in an air oven, even shorter heating times are desired.

Also, heating the parison exclusively from the outside further complicates the problem of sealing one end of the parison. The most economical method of forming parison preforms is to extrude a continuous length of tubing and cut this length of tubing into individual parisons, as opposed to injection molding a closed end parison preform. However, this necessitates sealing one end of the parison. It is apparent that the temperature at which maximum orientation occurs is below the optimum temperature for achieving a good seal. This problem is further complicated in heating of the parison in a heating block where the heat is imparted from the outside to the inside, since the portion of the parison which needs to be the hottest, the interior surface which is to be sealed, receives the least heat.

SUMMARY OF THE INVENTION

It is an object of this invention to provide for rapid heating of a preformed hollow parison. It is a further object of this invention to provide for substantially uniform heating of relatively thick walled parison preforms. It is yet a further object of this invention to provide for rapid heating of a parison preform to orientation temperature in a heating block by means of conductive heat to give a temperature conditioned parison that can be closed off and sealed at one end.

In accordance with this invention, a parison preform is positioned within a heating block and heated fluid is circulated inside it.

BRIEF DESCRIPTION OF THE DRAWINGS

FIG. 1 is a side elevation of a heating mechanism in accordance with the instant invention;

FIG. 2 is a section view along section lines 2-2 of FIG. 1; and

FIG. 3 is a section view along section lines 3-3 of FIG. 1.

DESCRIPTION OF THE PREFERRED EMBODIMENTS

The novel heating method of the instant invention can be used in the heating of hollow thermoplastic parison preforms made, for instance, of any orientable thermoplastic material such as polymers of at least one 1-olefin, said 1-olefin having 2 to 8 carbon atoms per molecule, polyvinyl chloride and the like. It is especially useful in the heating of parisons made from polymers of 1-olefins, selected from the group consisting of ethylene, propylene, butene, and mixtures thereof, more particularly, polypropylene. These polymers can be formed into hollow parison preforms and cooled to a temperature below their crystalline freezing point. The presently preferred method of fabricating these preforms is simply to extrude a continuous length of tubing which is severed into individual parisons of the desired length.

These hollow parison preforms in the solid state are then heated by means of the instant invention to a substantially uniform temperature of about 1° to about 50° F. below the crystalline melting point of said thermoplastic materials.

The instant invention is of particular utility in heating parison preforms which are thereafter transferred to a molding station where they are stretched longitudinally and expanded to conform to the shape of a mold by the application of internal pressure, thus imparting biaxial orientation to the finished product. This orientation process imparts as much as a 20-fold increase in the tensile strength to the plastic material.

The crystalline melt point can be determined by heating a small piece of the plastic under a polarizing microscope. The specimen is heated slowly to a temperature at which birefringence disappears and this temperature is the crystalline melt point.

The heating block can be either stationary or movable. Preferably, the heating block comprises a large metal wheel having a thickness slightly greater than the length of the parisons to be heated with at least one row of circles around the periphery of the wheel. In order to increase the capacity of the wheel, two or move more concentric rows of holes can be present so that a parison after being inserted at one point can travel approximately two revolutions of the wheel before being removed. In order to align the holes in the wheel, the axis carrying the wheel can be slid forward and backward.

Part or all of the wheel is then encased in an oven where heated air or the like is circulated through the parison. Preferably, a wheel-type heater is used with at least two separate ovens, so that the air can be circulated in one direction in one oven and in the opposite direction in the other oven, so as to minimize the "end effect" whereby the parison has a natural tendency to be heated less at the ends which are near the edges of the wheel. Any heating means can be utilized to provide the heat in the ovens, one arrangement being a simple resistance heating element with a motor driven fan to force the air over the element and circulate it through the hole in the wheel and thus over the inner surface of the parison.

Any gaseous fluid can be used in the heating ovens, air being preferred for reasons of simplicity and economy. An inert gas could, of course, be used if desired; however, since it is the purpose of the invention to heat the parison up to a temperature just below the crystalline melting point, it is apparent that problems of degradation are not severe at these temperatures.

Operating in accordance with this invention allows the benefits of conductive-type heating which is much more rapid than heating which can be effected in a simple air oven, and yet allows heating from both the inside and outside so as to further speed up the heating process.

In this regard, it is noted that the instant invention is of particular utility in heating thicker walled parisons, that is parisons having a wall thickness of greater than 100 mils, preferably 100—200 mils, more preferably 120—175 mils. It is difficult to heat thermoplastic parisons to orientation temperature because of the relatively narrow temperature limits which are permissible. This is further complicated in the instance of a thicker parison, and when viewed in terms of a commercial scale operation where long heating times to bring the parison up to the critical temperature are precluded, the process becomes even more difficult. Surprisingly, the particular combination of conductive heat from the outside and circulation of fluid such as air through the interior of the parison, particularly from alternate directions, effects especially uniform heating in a remarkably short time.

The heating block can be composed of any suitable structural material. Preferred materials are metals such as aluminum. It is essential that the portion of the heating block in contact with the parison be made of a high thermoconductivity material such as aluminum, aluminum alloys, magnesium, or other metal. The heating wheel, itself, can be heated by any conventional means, such as electrical resistance heating, impinging a flame upon the outer surface of the wheel, or utilizing a hollow wheel having tubular inserts for carrying the parison and circulating a fluid such as steam or heated oil through the hollow wheel.

Referring now to the drawings forming a part thereof in which like reference characters depict like parts in the various views, particularly FIG. 1, there is shown a circular heating block or wheel 12 rotating about shaft 14. Around the periphery of wheel 12, concentric with shaft 14, are a series of holes 16 adapted to receive parisons. Throughout most of its circumference, the peripheral portion of wheel 12 containing holes 16 passes through circulating air ovens 18 and 20. Preferably, there are at least two separate ovens so that the air can be circulated in one direction in one oven and in the other direction in the other oven to give equal heating to both ends of the parison. A single oven could be utilized, however, and of course, three or more separate ovens could be utilized. The temperature will generally be identical in all of the ovens, although it is within the scope of the invention to utilize a higher temperature in the oven into which the parison is first conveyed after being inserted in the wheel, so as to speed up the initial heating of the parison.

Referring now to FIG. 2, there is seen the wheel and oven assembly of FIG. 1 in cross section. Motors 22 and 24 are shown driving fans 26 and 28 respectively. The motors can be located on the same side of the wheel, if desired, with provisions made to suck air over the heaters by using a reverse pitch fan or the like. Since the two ovens are identical except for the provision for blowing the air over the parison in one direction in one oven and the other direction in the other oven, detailed description is necessary of only one oven. In oven 18, for instance, fan 26 blows circulating fluid such as air over electrically heated resistance elements 30. The thus heated air is directed by means of wall 32 and any accessory baffles which may be desired such as wall 33 into hole 16 where said heated air flows through the interior of parison 34 from a first direction. As can be seen from a view of oven 20, the air flows through the parison from a second direction, thus equalizing the heat imparted to each end. The entire apparatus is supported by frame 36. Shaft 14 is carried by bearings 38 and rotated by means not shown. Wheel 12 is heated by means of electrical cartridge heaters 40.

Referring now to FIG. 3, there is shown means to insert parison which comprises guide 42 and pusher rod 44. Means to remove heated parison comprises guide block 46 and expandable prongs 48 carried by collar 50. Prongs 48 are moved axially forward, expanded to grip the heated parison and thereafter retracted. A parison is placed in guide 42 and pushed into hole 16 by means of pusher 44. The wheel then rotates forward an increment to allow removal of the next heated parison and insertion of the next cold parison.

ILLUSTRATIVE EMBODIMENT

Polypropylene homopolymer, having a density of 0.905 (ASTM D 1501-63T), a melt index of 2 (ASTM D 1238-62T, Condition L), and a crystalline melting point of 340° F., was extruded into tubing having an internal diameter of 0.85 inch and a wall thickness of 0.15 inch. This tubing was cooled to room temperature and cut into 5 inch lengths. These 5 inch lengths of tubing are placed one at a time in holes corresponding in size to the parison so as to have direct metal to polymer contact in a rotating aluminum wheel such as is shown in FIG. 1 having electrical resistance heating means. After being placed in the hole, the wheel is periodically advanced so as to move the parison through a first oven where heated air is blown through the interior of the parison in a first direction. The periphery of the wheel then passes into a second oven where heated air is blown through the parison in the opposite direction. The wheel continues to advance until the hole containing the parison is back to the original starting point at which point a mechanical prong is extended into the parison and expanded by mechanical means to contact the inner wall of the parison so as to grip the parison from the inside. This mechanical prong is then retracted, pulling the heated parison from the wheel preparatory to the introduction of a new parison by the feeder mechanism. The entire cycle requires 4 minutes, the parison being heated substantially uniformly to orientation temperature of about 320° to 338° F. in this time.

For comparison, a second group of identical parisons were placed in the same heater wheel under identical conditions except that the ovens were not used, all the heat being imparted by means of conduction through the outside, due to contact of the parison wall with the heater wheel. The wheel was rotated at the maximum speed possible to achieve heating of the parison to orientation temperature in 1 revolution. The time required was 6 minutes. As a further comparison, identical parisons were heated in a circulating air oven under optimum conditions to achieve rapid heating. The time required to heat the parisons to orientation temperature was 24 minutes.

While this invention has been described in detail for the purpose of illustration, it is not to be construed as limited thereby, but is intended to cover all changes and modifications within the spirit and scope thereof.

I claim:

1. A method of heating a tubular thermoplastic parison comprising: introducing said parison into a heating block; imparting heat to the outside of said parison by conduction through direct contact with said heating block; and passing heated gaseous fluid through the interior of said tubular parison.

2. A method according to claim 1 wherein said heating block is a metallic wheel rotating about an axis with at least one row of holes around the periphery of said wheel concentric with said axis, said wheel being rotated so as to pass parisons after introduction into said wheel through at least one circulating air oven.

3. A method according to claim 2 wherein there are two circulating air ovens and heated air is passed through the interior of said parisons in a first direction in one oven and is passed in the reverse direction in the other oven.

4. A method according to claim 2 wherein said thermoplastic material is a polymer of a 1-olefin selected from the group consisting of ethylene, propylene, butene, and mixtures thereof, said heating being controlled so as to heat the bulk of said thermoplastic material to within 1° to 50° F. of the crystalline melting point of said thermoplastic material.

5. A method according to claim 4 wherein said thermoplastic material is polypropylene.

6. A method according to claim 4 wherein said parison has a wall thickness of greater than 100 mils.

7. A method according to claim 4 wherein said parison has a wall thickness of 120 to 175 mils.

8. Apparatus for heating a length of tubular material comprising in combination: a frame; a rotating wheel having an axis carried by said frame, said wheel having at least one row of holes around the periphery thereof, said holes being arranged in a pattern concentric with said axis and adapted to receive said tubular material; means to heat said wheel; at least one oven disposed such that the periphery of said wheel containing said holes rotates through said oven throughout a portion of its circumference; means to insert said lengths of tubular material into said holes; means to circulate heated air through the interior of said lengths of material; and means to remove said lengths of tubular material after a portion of said wheel containing said lengths has been rotated through said at least one oven.

9. Apparatus according to claim 8 wherein there are two ovens, said means to circulate said heated air comprising a means to circulate said air in a first direction through said lengths of material in one oven and to circulate said air in the opposite direction in said second oven.

10. Apparatus according to claim 9 wherein the portion of said wheel adapted to receive said tubular material comprises aluminum.